US005431271A

United States Patent [19]

Abraham et al.

[11] Patent Number: 5,431,271

[45] Date of Patent: Jul. 11, 1995

[54] INDICATOR FOR A PASSENGER CONVEYING DEVICE

[75] Inventors: Detlev Abraham, Berlin; Dietmar Krueger, Rintein, both of Germany

[73] Assignee: Otis Elevator Company, Farmington, Conn.

[21] Appl. No.: 224,433

[22] Filed: Apr. 8, 1994

[51] Int. Cl.[6] .............. B65G 15/00

[52] U.S. Cl. .............. 198/324; 198/335; 198/502.1

[58] Field of Search .............. 198/324, 335, 502.1

[56] References Cited

U.S. PATENT DOCUMENTS

| | | | |
|---|---|---|---|
| 4,798,274 | 1/1989 | Saito | 198/324 |
| 5,040,659 | 8/1991 | Saito et al. | 198/324 |
| 5,067,062 | 11/1991 | Rülke | 362/146 |

FOREIGN PATENT DOCUMENTS

| | | | |
|---|---|---|---|
| 8802742.2 | 8/1988 | Germany . | |
| 8814588.3 | 1/1989 | Germany . | |
| 1-285582 | 11/1989 | Japan | 198/335 |
| 2-0127390 | 5/1990 | Japan | 198/324 |
| 3-023187 | 1/1991 | Japan | 198/335 |
| 4-075995 | 3/1992 | Japan | 198/335 |

*Primary Examiner*—Cheryl L. Gastineau

[57] ABSTRACT

An electronic indicator device 24 is disposed on the outer deck profile 20 of a passenger conveying device 10. The indicator device 24 includes a display 52 capable of displaying a symbol indicative of direction of operation and stopped operation of the passenger conveying device 10. The indicator device 24 comprises a post 30 attached at a lower end thereof to the outer deck 20 and having a display housing 42 attached at angle at an upper end of post 30. The electronic display 52 is disposed in the display housing 42. A base 26 is disposed on the outer deck 20 with the post 30 passing through an opening in the base 26. A transparent enclosure 44 having upper and lower openings is disposed over the base 26, the post 30 and the display housing 42, with the display 52 disposed within the upper opening of the enclosure 44. A logic circuit 64 interfaces with the passenger conveying device 10 and the display 52 to determine the symbol indicative of the operational feature of the passenger conveying device 10 to be displayed.

26 Claims, 3 Drawing Sheets

INDICATOR FOR A PASSENGER CONVEYING DEVICE

BACKGROUND OF THE INVENTION

1. Technical Field

This invention relates to an indicator for a passenger conveying device. More specifically, this invention relates to an indicator advantageously positioned relative to a balustrade of a passenger conveying device, such as a moving stairway or a moving walkway.

2. Background Information

Escalators, moving walkways, and other people moving devices efficiently move a large volume of pedestrian traffic from one point to another. Passengers step on moving steps (or belts, or pallets) and are transported along the length of the device from a first landing to a second landing at a constant rate of speed.

It is known in the art that escalators and other passenger conveying devices may convey passengers from the first landing to the second landing, or vice versa. This is particularly true in public transportation settings where a plurality of escalators are positioned side by side. During a morning rush hour, for example, passenger traffic may flow best if a majority of the escalators are directed to convey passengers towards the public transportation. During the evening rush hour the opposite may be true; traffic may flow best if the majority of escalators are directed away from the public transportation. In any case, a person of skill will recognize that there is a need to inform passengers of the escalator's direction if it is subject to change.

Directional indicators are known for public transportation escalators found in airports, subway stations, train stations, and the like. Typically they are mounted on stantions independently positioned a distance away from the landing of the escalator. Because of space and aesthetic constraints, directional indicators mounted on stantions are typically not used in indoor settings such as office buildings and department stores.

A directional indicator device for escalators is shown in U.S. Pat. No. 4,798,274, wherein an illumination device is mounted on the outside surface of a transparent balustrade panel for illuminating the landing of the escalator. A decorative member or cover is mounted on the inside surface of the transparent balustrade panel to cover the back side of the illumination device. The decorative member has a mirror surface to enable persons approaching the escalator to view the landing area. This decorative member further has an arrow thereon for indicating the running direction of an escalator.

SUMMARY OF THE INVENTION

Therefore, it is an object of the present invention to provide an indicator positioned relative to a balustrade in an aesthetically pleasing manner.

It is a further object of the present invention to provide an indicator for passenger conveying devices which indicates a non-operating condition as well as the direction of operation.

In accordance with the present invention, an indicator having a display is disposed on the balustrade outer decking of a passenger conveying device. The indicator is electrically connected to the passenger conveying device with the display indicating non-operating and direction of operation conditions of the passenger conveying device.

The present invention provides an indicator for passenger conveying devices which is positioned in an aesthetically pleasing manner, whereby the indicator would be acceptable for use in department stores and the like. Use of this indicator will result in safer operation of the passenger conveyor device. Approaching passengers will now be informed as to which way an escalator or walkway is traveling, that an escalator or walkway is stationary, and which way a stationary escalator or walkway may begin to travel.

The foregoing and other objects, features and advantages of the present invention will become more apparent in light of the following detailed description of the invention, as shown in the accompanying drawings.

BEST MODE FOR CARRYING OUT THE INVENTION

Figure 1:
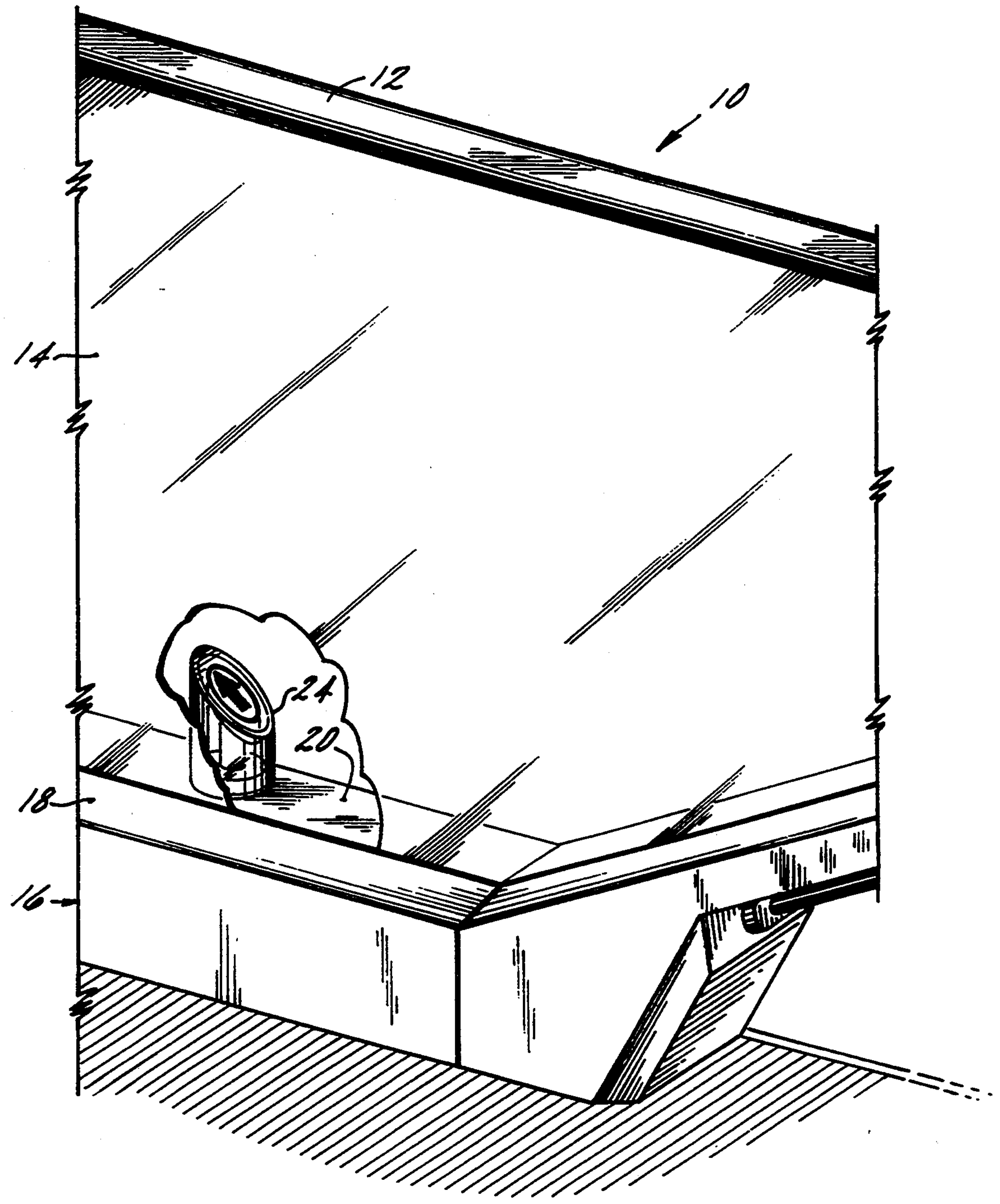
FIG. 1 is a perspective view showing a portion of an escalator around a landing area with the escalator employing an indicator mounted on the outer decking in accordance with the present invention.

Referring now to FIG. 1, a portion of an escalator around a landing area is shown generally at 10. The escalator 10 comprises a plurality of steps (not shown) connected together in an endless loop circulating between upper and lower landings. A balustrade assembly comprising a base 16, a plurality of balustrade panels 14, and a handrail 12 is positioned on each side of the moving steps (only one of which is shown) as is known in the art. The balustrade panels 14 extend out from the base 16 to support the handrail 12 which travels in the same direction as the moving steps. The base 16 includes an inner decking 18 and an outer decking 20. The balustrade panels 14 may comprise glass or any other suitable transparent material, e.g., a transparent plastic.

In accordance with the present invention, an indicator device 24 is disposed on the outer decking 20 in the general proximity of the landing area of the escalator 10. The indicator device 24 is positioned for ease of viewing by persons approaching the escalator 10. While the description herein is directed to an escalator, it will be appreciated that any passenger conveyor device may employ the present invention (e.g., a moving walkway).

Figure 3:
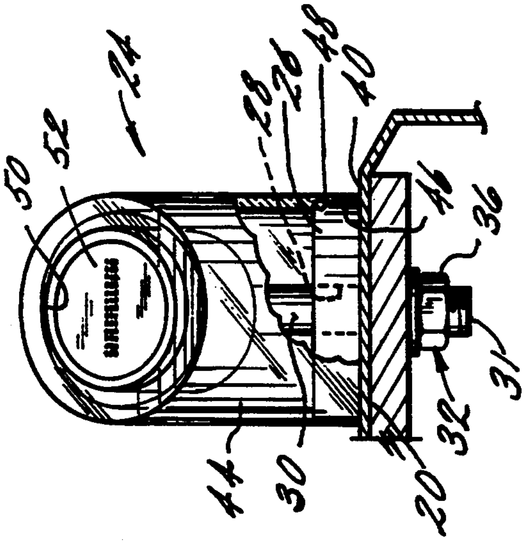
FIG. 3 is a front view of the indicator shown in FIG. 1.
Figure 2:
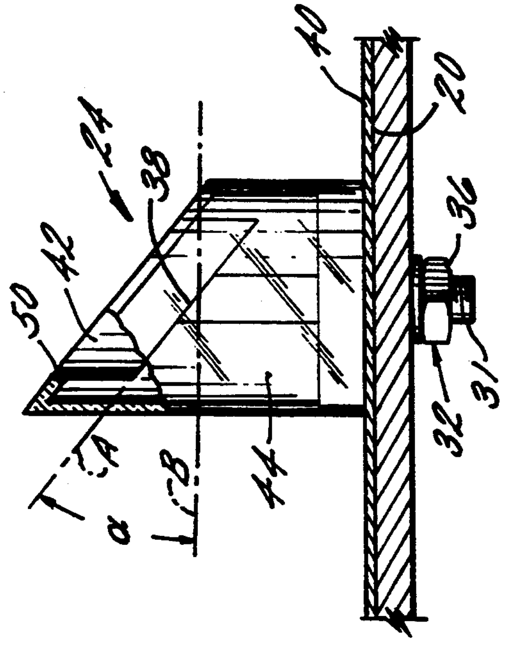
FIG. 2 is a side elevation view of the indicator shown in FIG. 1.

Referring to FIGS. 2 and 3, the indicator device 24 comprises a cylindrical base 26 having an opening 28 therethrough at about the center thereof. A post 30 is attached at the lower end 31 thereof to the outer decking 20 by a fastener 32. In this example, the lower end 31 of the post 30 is threaded and a nut 36 and washer are used to attach the post 30 to the outer decking 20. An upper end 38 of the post 30 is cut at an angle $\alpha$ defined by the intersection of a plane A in which the upper end 38 lies and a plane B parallel with an upper surface 40 of the outer decking 20, this angle $\alpha$ being about 40°. A display housing 42 is mounted at the upper end 38 of the post 30 such that the upper surface of the display housing 42 is also disposed at angle $\alpha$. A transparent cylindrical enclosure 44 is disposed over the display housing 42, the post 30 and the base 26. The transparent enclosure 44 has an opening 46 at its lower end, with the inner diameter of this opening closely matching the outer diameter of the base 26 disposed therein. The transparent enclosure 44 may be comprised of glass or any other suitable transparent material, e.g., a transparent plastic. Further, the enclosure may also be comprised of other than a transparent material, e.g., aluminum with a brushed finish or a reflective material. A shoulder 48 is defined near the lower end of the enclosure 44, with the shoulder 48 disposed on the upper surface of the base 26 about the circumference thereof. The upper end of the enclosure 44 is cut such that the upper surface of the enclosure 44 is also disposed at angle $\alpha$. The upper end of the enclosure 44 has an opening 50, with the inner diameter of this opening closely matching the outer diameter of the display housing 42 disposed therein. It will be appreciated that while the indicator device 24 has been described above as having a generally cylindrical shape, other shapes will suffice, e.g., polygonal.

Figure 4:
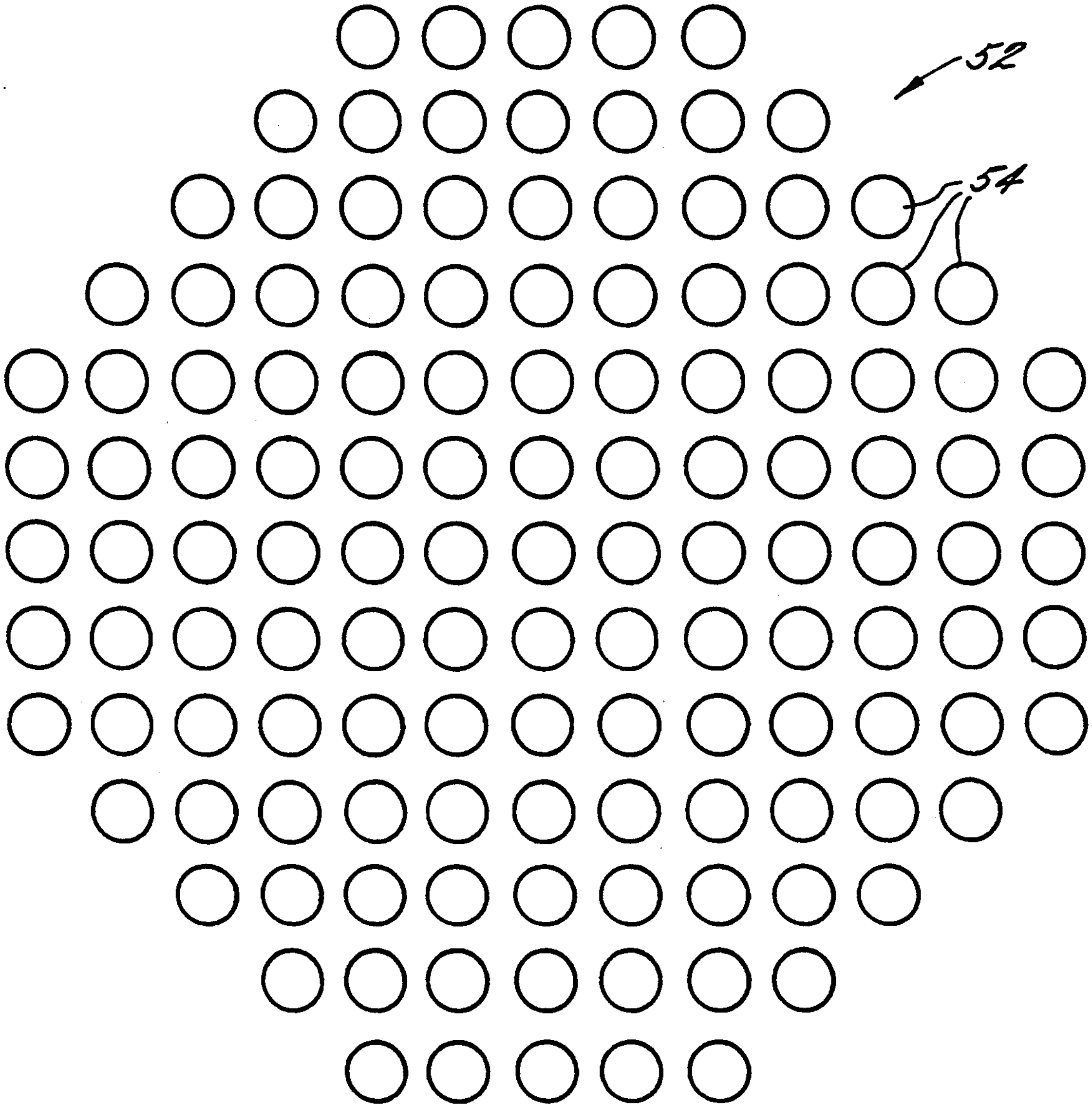
FIG. 4 is a diagrammatic view of a display of the indicator of FIG. 1.

The display housing 24 houses a display 52 capable of displaying a desired symbol. The display 52 comprises an array or matrix of light emitting diodes (LEDS) 54, diagrammatically shown in FIG. 4. The LEDS 54 are preferably triple color LEDS (i.e., green, red and blue LEDS, as such are well known), however single or double color LEDS may be employed. Moreover, it is within the scope of the present invention that the display 52 comprise a liquid crystal display or any other electronic display capable of displaying a desired symbol. By way of example only, a stop or non-operating signal is shown in the display 52 in FIG. 3 and a directional signal is shown in the display 52 in FIG. 1. These particular signals may be used with intermittent operation passenger conveyor devices, but are not intended to be limited to such. Further, the desired color combination of the displayed symbol can be selected to fit the environment where the indicator is being used. It is within the scope of the present invention that different symbols, even moving signals, can be displayed, as such is dictated by the particular application.

Figure 5:
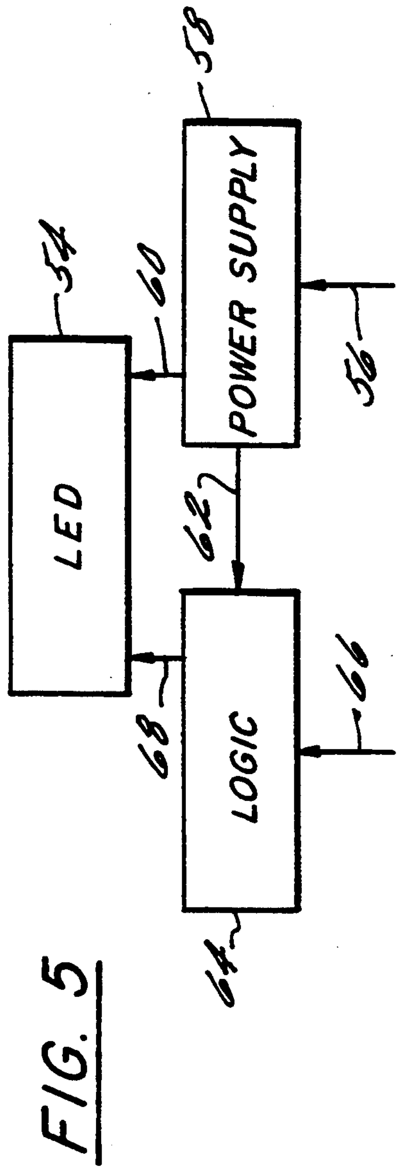
FIG. 5 is a schematic block diagram of the electronics of the indicator of FIG. 1.

Referring now to FIG. 5, a schematic block diagram of the electronics for the indicator 24 is shown. The electronics may be housed in the base 26 or in the display housing 24 with external connections to supply and command signals. A supply line 56 is connected to a power supply 58 which converts a.c. line power to d.c. voltage signals present on a line 60 for powering the LEDS 54 and present on a line 62 for powering a logic circuit 64. The logic circuit 64, in response to command signals from a line 66, generates display signals which are presented on a line 68 to the LEDS 54, whereby the LEDS are activated to generate the requested signal. The logic circuit 64 may comprise a microprocessor or a programmable logic (e.g., PAL or GAL). The command signals and preferably the power signal originate for the escalator 10 itself, for example on wires passing through an opening in the outer decking 20 under the base 26.

While preferred embodiments have been shown and described, various modifications and substitutions may be made thereto without departing from the spirit and scope of the invention. Accordingly, it is to be understood that the present invention has been described by way of illustration and not limitation.

We claim:

1. A passenger conveying device comprising:

means for moving passengers;

a balustrade assembly disposed at a side of said means for moving passengers, said balustrade assembly comprising:

a base, having an inner decking and an outer decking;

a balustrade panel, extending upwardly from said base, wherein said inner decking is positioned between said means for moving passengers and said balustrade panel, and said outer decking is positioned on a side of said balustrade panel opposite said means for moving passengers; and means for indicating an operational mode of said passenger conveyor device, wherein said indicating means is disposed on said outer decking and comprises post attached at a lower end thereof to said outer decking;

a housing mounted at an upper end of said post at an angle relative to said outer decking; and electronic display means disposed in said housing said electronic display means for electronically displaying a symbol indicative of the operational mode of said passenger conveying device.

2. The passenger conveying device of claim 1 wherein said electronic display means comprises:

an array of light emitting diodes activated to display the symbol indicative of the operational mode of said passenger conveying device.

3. The passenger conveying device of claim 1 wherein the operational mode of said passenger conveying device includes a direction of operation or a stopped operational condition.

4. The passenger conveying device of claim 1 further comprising:

an enclosure having upper and lower openings, said enclosure disposed over said post and said housing with said electronic display means disposed in said upper opening.

5. The passenger conveying device of claim 4 wherein said enclosure is transparent.

6. The passenger conveying device of claim 4 wherein said enclosure has a generally cylindrical shape.

7. The passenger conveying device of claim 1 further comprising:

a base disposed on said outer decking, said base having an opening wherein said post passes through.

8. The passenger conveying device of claim 7 further comprising:

an enclosure having upper and lower openings, said enclosure disposed over said base, said post and said housing with said electronic display means disposed in said upper opening.

9. The passenger conveying device of claim 1, wherein the passenger conveying device is an escalator.

10. A passenger conveying device comprising:

means for moving passengers;

a balustrade assembly disposed at a side of said means for moving passengers, said balustrade assembly comprising;

a base, having an inner decking and an outer decking;

a balustrade panel extending upwardly from said base, wherein said inner decking is positioned between said means for moving passengers and said balustrade panel, and said outer decking is positioned on a side of said balustrade panel opposite said means for moving passengers;

means for indicating an operational mode of said passenger conveyor device wherein said indicating means is disposed on said outer decking and comprises electronic display means for electronically displaying a symbol indicative of the operational mode of said passenger conveying device; and logic circuit means for interfering with said passenger conveying device and said electronic display means to determine the symbol indicative of the operational mode of said passenger conveying device to be displayed, said logic circuit means activating said electronic display means to display said signal.

11. The passenger conveying device of claim 10, wherein said indicating means comprises:

a post attached at a lower end thereof to said outer decking;

a housing mounted at an upper end of said post at an angle relative to said outer decking; and electronic display means disposed in said housing, said electronic display means for electronically displaying a symbol indicative of the operational mode of said passenger conveying device.

12. An indicator for a passenger conveying device comprising:

a post having means for attachment at a lower end thereof;

a housing mounted at an upper end of said post at a non-zero angle relative to a central axis of said post; and electronic display means disposed in said housing, said electronic display means for electronically displaying a symbol indicative of an operational mode of the passenger conveying device.

13. The indicator of claim 12 further comprising:

an enclosure having upper and lower openings, said enclosure disposed over said post and said housing with said electronic display means disposed in said upper opening.

14. The indicator of claim 13 wherein said enclosure is transparent.

15. The indicator of claim 13 wherein said enclosure has a generally cylindrical shape.

16. The indicator of claim 12 further comprising:

a base disposed on said post near the lower end thereof, said base having an opening wherein said post passes through.

17. The indicator of claim 16 further comprising:

an enclosure having upper and lower openings, said enclosure disposed over said base, said post and said housing with said electronic display means disposed in said upper opening.

18. The indicator of claim 12 further comprising:

logic circuit means for interfacing with the passenger conveying device and said electronic display means to determine the symbol indicative of the operational feature of the passenger conveying device to be displayed, said logic circuit means activating said electronic display means to display said signal.

19. The indicator of claim 12 wherein the passenger conveying device is an escalator.

20. The indicator according to claim 12, further comprising:

logic circuit means for interfacing with said passenger conveying device and said electronic display means to determine the symbol indicative of the operational feature of said passenger conveying device to be displayed, said logic circuit means activating said electronic display means to display said signal.

21. A passenger conveyor device comprising:

means for moving passengers:

a balustrade assembly disposed at a side of said means for moving passengers, electronic indicating means disposed near said balustrade assembly, said electronic indicator means for indicating an operational mode of said passenger conveying device and comprising electronic display means for electronically displaying a symbol indicative of the operational feature of said passenger conveyor device: and logic circuit means for interfacing with said passenger conveying device and said electronic display means to determine the symbol indicative of the operational feature of said passenger conveying device to be displayed, said logic circuit means activating said electronic display means to display said signal.

22. The passenger conveying of device of claim 21 wherein said electronic display means comprises:

an array of light emitting diodes activated to display the symbol indicative of the operational mode of said passenger conveying device.

23. The passenger conveying device of claim 21 wherein the operational mode of said passenger conveying device includes a direction of operation or a stopped operational condition.

24. The passenger conveying device of claim 21, wherein the passenger conveying device is an escalator.

25. The passenger conveying device of claim 21, wherein said electronic indicator means comprises:

a post having means for attachment at a lower end thereof, a housing mounted at an upper end of said post at a non-zero angle relative to a central axis of said post; and electronic display means disposed in said housing, said electronic display means for electronically displaying a symbol indicative of an operational mode of the passenger conveying device.

26. A passenger conveyor device comprising:

means for moving passengers;

a balustrade assembly disposed at a side of said means for moving passengers, and electronic indicating means disposed near said balustrade assembly, said electronic indicator means for indicating an operational mode of said passenger conveying device, said electronic indicator means comprising:

a post having means for attachment at a lower end thereof;

a housing mounted at an upper end of said post at a non-zero angle relative to a central axis of said post; and electronic display means disposed in said housing, said electronic display means for electronically displaying a symbol indicative of an operational mode of the passenger conveying device.

* * * * *